United States Patent
Gunzelmann et al.

(10) Patent No.: US 6,532,255 B1
(45) Date of Patent: Mar. 11, 2003

(54) METHOD AND ARRANGEMENT FOR MINIMIZING THE AUTOCORRELATION ERROR IN THE DEMODULATION OF A SPREAD-SPECTRUM SIGNAL SUBJECT TO MULTIPATH PROPAGATION

(75) Inventors: Bertram Gunzelmann, Augsburg (DE); Arkadi Molev-Shteiman, Bnei Brak (IL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/395,304

(22) Filed: Sep. 13, 1999

(30) Foreign Application Priority Data

Sep. 17, 1998 (DE) .......................... 198 42 712

(51) Int. Cl.⁷ ............................................. H04L 27/06
(52) U.S. Cl. ...................................... 375/150; 375/343
(58) Field of Search ................................ 375/142, 150, 375/343

(56) References Cited

U.S. PATENT DOCUMENTS 6,084,927 A * 7/2000 Pon ............................ 375/343

FOREIGN PATENT DOCUMENTS

| DE | 37 43 731 C2 | 11/1994 | ............. H04J/03/00 |
|----|--------------|---------|----------------|
| WO | WO 97/06446 | 2/1997 | ............. G01S/1/04 |

OTHER PUBLICATIONS

Frank Schrödter: "GPS Satelliten–Navigation" {GPS satellite navigation], Franzis Verlag, Müchen, 1994.
Jack K. Holmes: "Coherent Spread Spectrum Systems", Robert E. Krieger Publishing Company, Malabar, Florida.
Helmuth Lemme: "Schnelles Spread–Spectrum–Modem auf einem Chip"[fast spread spectrum modem on a chip], Elektronik 15, 1996, pp. 38–45.

Jean–Marie Zogg–Weber: "ICs für GPS–Empfänger" [ICs for GPS–receiver], Elektronik 1, 1997, pp. 30–34.

* cited by examiner

*Primary Examiner*—Don N. Vo
*Assistant Examiner*—Dung X Nguyen
(74) *Attorney, Agent, or Firm*—Laurence A. Greenberg; Werner H. Stemer; Ralph E. Locher

(57) ABSTRACT

A method is disclosed relating to an arrangement for minimizing the autocorrelation error in the demodulation of a spread-spectrum signal subject to multipath propagation. The received signal is received from a transmitter via a plurality of propagation paths. A demodulator produces a local spread sequence, which is correlated with the received spread sequence in a first control loop on a first phase-angle pair which has a first early-late spacing $2\Delta_1$, and which is correlated with the received spread sequence in a second control loop on a second phase-angle pair which has a second early-late spacing $2\Delta_2$. The first and the second control loop emit a first point phase value T1 and a second point phase value $T_2$, respectively, when in the steady state, which phase values express the phase angles of the received spread sequence with respect to the local spread sequence on the first phase angle pair or on the second phase angle pair, respectively. The phase value (T0) (which is supplied to a demodulation correlator) of the local spread sequence with respect to the received spread sequence is calculated using the formula $T_0=(\Delta_2 T_1-\Delta_1 T_2)/(\Delta_2-\Delta_1)$, where $\Delta_2$ is chosen to be less than $\Delta_1$.

8 Claims, 4 Drawing Sheets

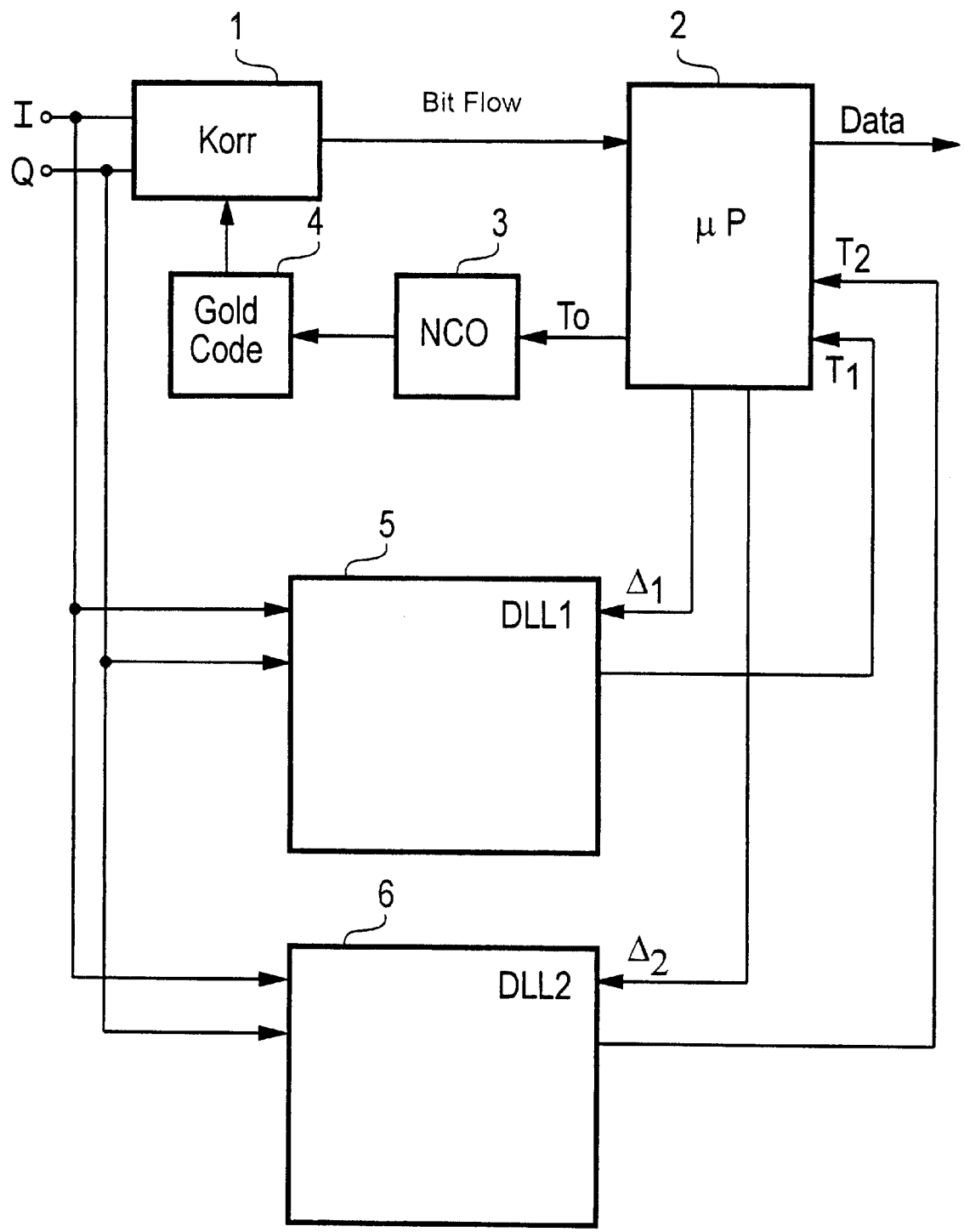

METHOD AND ARRANGEMENT FOR MINIMIZING THE AUTOCORRELATION ERROR IN THE DEMODULATION OF A SPREAD-SPECTRUM SIGNAL SUBJECT TO MULTIPATH PROPAGATION

BACKGROUND OF THE INVENTION

Field of the Invention

The invention relates to a method for minimizing the autocorrelation error in the demodulation of a spread-spectrum signal subject to multipath propagation, according to the precharacterizing clause of Patent claim 1, and to an arrangement for demodulating a spread-spectrum signal subject to multipath propagation, according to the precharacterizing clause of Patent claim 5.

Wire-free transmission methods based on a spread spectrum have been used for many years for data communication between transmitting or receiving stations on the earth and transmitting or receiving stations in satellites. In many cases, the direct sequence method is preferred as the spreading method, in which a low-rate digital information signal is modulated with a high-rate, pseudo-random binary sequence. If the receiver knows the pseudo-random binary sequence used for modulation in the transmitter, it can extract the original, digital information signal from the pseudo-noise signal produced in this case.

Such methods are used for data communication, position-finding and navigation. One important field of application is, for example, real-time satellite navigation using the NAVSTAR GPS (Navigation System with Timing and Ranging, Global Positioning System) which is described, for example, in SCHRÖDTER, GPS Satelliten-Navigation [GPS satellite navigation], Franzis-Verlag Munich, 1994. In this case, a large number of satellites orbiting in different orbit trajectories emit a large number of different position-finding signals, of which at least a specific minimum number can be received at any point on the earth's surface. The location of the receiver can be calculated and output in a conventional coordinate system, from the received position-finding signals.

In order that a receiver can identify a satellite transmitter and can evaluate the position-finding information transmitted by it, said receiver must know the transmitter-specific pseudo-random binary sequence (gold code) which is transmitted as a periodic signal sequence of predetermined length. In order to find the code, all the codes of the transmitters in question are stored in the receiver. Since the phase angle of each incoming signal is unknown, the match between the received spread sequence (gold code) and a locally produced spread sequence is found in an acquisition method. The comparison is carried out via the correlation function of the signal, which becomes a maximum when the received spread signal is synchronized with the locally produced spread sequence.

Since the transmitter and the receiver move relative to one another, synchronization is maintained by slaving the phase angle of the locally produced spread sequence to the received spread sequence. This is done by controlling the clock of the locally produced spread sequence as a function of the determined phase error.

Until now, a delay locked loop (DLL) has been used as the control loop for this purpose, as is described, for example, by J. K. Holmes in "Coherent Spread Spectrum Systems", Robert E. Krieger, 1990. A similar description is also given by Helmuth Lemme in the article "Schnelles Spread-Spectrum-Modem auf einem Chip" [fast spread-spectrum modem on a chip disk] in Elektronik [Electronics] 15/1996, pages 38 to 45, in particular in FIG. 7 there. The DLL method is based on the fact that the locally produced spread sequence is phase-shifted by the same amount before and after the expected point in time, and the received spread sequence is correlated with the spread sequences of this earlier and later time separately from one another in two correlators. The correlation values emitted from the correlators are then subtracted from one another. The control loop is set in such a manner that the subtraction result becomes zero in the steady state.

However, in a real reception environment, the receiver often does not just receive the transmitted signal on the direct path, but a portion of the received signal results from reflection of the transmitted signal on a nearby terrain profile or a nearby building. This reception situation is called multipath propagation. The receiver accordingly receives a signal mixture comprising a superimposition of the transmitted signal, with a plurality of phase angles each having a different amplitude. This on the one hand exacerbates signal acquisition in the receiver and, furthermore, corrupts the position-finding result, since the position-finding calculations are based on the signal reception times for the directly received transmitted signal.

SUMMARY OF THE INVENTION

The invention is thus based on the technical problem of specifying a method and an apparatus by means of which the phase angle of the locally produced spread sequence is slaved as accurately as possible to the directly received signal once the signal has been acquired.

The problem is solved by a method having the features of Patent claim 1. The problem is furthermore solved by an arrangement having the features of Patent claim 5. Advantageous refinements of the method and of the arrangement are specified in the respective dependent claims.

In one embodiment of the method for minimizing the autocorrelation error in the demodulation of a spread-spectrum signal subject to multipath propagation, the received spread it sequence is supplied to a first control loop and to a second control loop. The two control loops operate on the principle of a delay locked loop DLL. The first control loop operates with a first phase-angle pair, which has a first phase spacing or early-late spacing $2\Delta_1$. The second control loop operates with a second phase-angle pair, which has a second early-late spacing $2\Delta_2$. The two control loops are supplied with a locally produced spread sequence, for correlation with the received spread sequence. The first control loop emits a first point phase value $T_1$ in the steady state, and the second control loop emits a second point phase value $T_2$ in the steady state. The method is characterized in that the phase value $T_0$ (which is supplied to a demodulation correlator) of the local spread sequence with respect to the received spread sequence is calculated using the formula $T_0=(\Delta_2 T_1 - 2\Delta_1 T_2)/(\Delta_2-\Delta_1)$, where $\Delta_2$ is chosen to be less than $\Delta_1$. With the use of an additional control loop, the method allows any control error contained in each individual control loop as a result of the signal being distorted by multipath propagation to be eliminated by means of a simple rule, and thus allows a calculation to be made back to the correct time of the directly received signal. The rule can advantageously be used continuously and provides correct results without the receiver having to detect whether multipath propagation is or is not present.

In one preferred refinement of the method, the ratio of the first early-late spacing $2\Delta_1$ to the second early-late spacing $2\Delta_2$ is two to one. This is particularly advantageous when the control loops under consideration are parts of a hierarchical control loop structure. In such hierarchical control loop structures, the ratios of the early-late spacings of individual control loops are typically multiples of powers of two. In this case, it is very particularly preferable for the correction rule to be applied to the innermost control loops of the hierarchical control loop structure, when using a hierarchical control loop. The innermost control loops are in this case those whose respective delay locked loops DLL have the smallest early-late spacings.

It is very particularly preferable for at least either the first early-late spacing D1 or the second early-late spacing D2 to be considerably less than the expected minimum signal delay time difference between a plurality of propagation paths. This makes it possible to ensure that the correction of the control error can be carried out precisely as far as a specific resolution.

A preferred arrangement for demodulating a spread-spectrum signal which is received from a transmitter via a plurality of propagation paths has a generator for producing a local spread sequence and has a first control loop in which the received spread sequence is correlated with the local spread sequence on a first phase-angle pair which has a first early-late spacing $2\Delta_1$. The arrangement furthermore has a second control loop in which the received spread sequence is correlated with the local spread sequence on a second phase-angle pair which has a second early-late spacing $2\Delta_2$. The first and the second control loop emit a first point phase value $T_1$ and a second point phase value $T_2$, respectively, when in the steady state. The arrangement is characterized by a device for determining the phase value $T_0$ (which is supplied to a demodulation correlator) of the local spread sequence with respect to the received spread sequence using the formula.

$T_0=(\Delta_2 T_1 - 2\Delta_1 T_2)/(\Delta_2 - \Delta_1)$ where D2 is chosen to be less than $\Delta_1$. The arrangement is particularly advantageously suitable for carrying out the method according to the invention.

Other features which are considered as characteristic for the invention are set forth in the appended claims.

Although the invention is illustrated and described herein as embodied in a method and arrangement for minimizing the autocorrelation error in the demodulation of a spread-spectrum signal subject to multipath propagation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 shows an exemplary embodiment of an arrangement according to the invention for demodulating a spread-spectrum signal.

DESCRIPTION OF THE PREFERRED EMBODIMENTS

Figure 1:
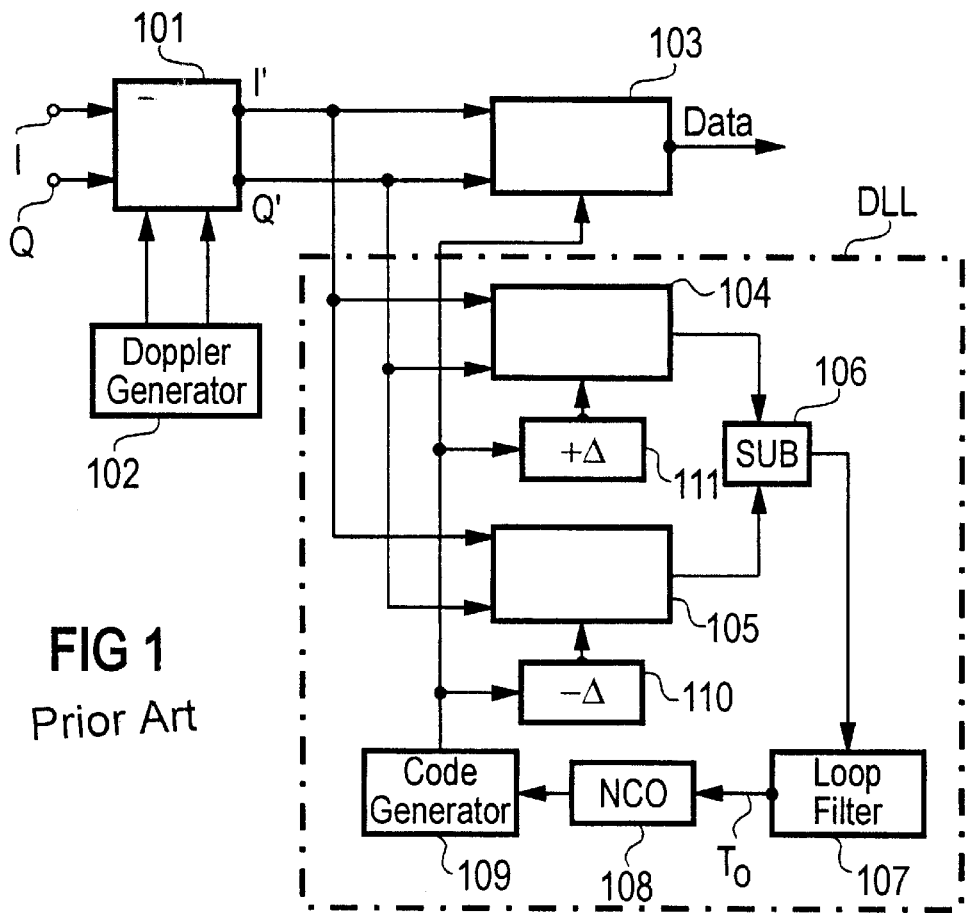
FIG. 1 shows a delay locked loop (DLL) according to the prior art.

FIG. 1 shows a delay locked loop (DLL) according to the prior art. The spread signal which is received by an antenna and is in the form of a direct sequence is mixed to baseband using a quadrature demodulator, resulting in the in-phase component I as well as the quadrature-component Q. The in-phase component I and the quadrature component Q are supplied to a phase shifter 101, which is connected to a Doppler generator 102. The phase shifter 101 eliminates the Doppler shift in the frequency of the received signal caused by the relative motion of the transmitter and receiver. The in-phase component I' and the quadrature component QT corrected in this way are passed in parallel to three correlators 103, 104 and 105, in which the received baseband signal is correlated with the spread sequence produced by a code generator 109. The code generator 109 produces the characteristic transmitter code (the gold code), by which means the data signal contained in the transmitted signal can be recovered.

At its output, the demodulation correlator 103 emits the demodulated data when the received signal matches the phase of the gold code produced locally in the code generator 109. The phase match is ensured by the delay locked loop DLL comprising the correlators 104 and 105, a subtractor 106, a loop filter 107, a numerically controlled oscillator (NCO) 108 and the fixed-setting delay elements 110 and 111. The gold code is supplied with a fixed negative phase shift $-\Delta$ and a positive phase shift $+\Delta$, respectively, by means of the fixed-setting delay elements 110 and 111 to the correlators 105 and 104. The subtractor 106 is used to subtract the output signals from the correlators 104 and 105 from one another, and the result is supplied to the loop filter 107. The loop filter 107 passes a signal to the NCO 108, which corresponds to a phase angle T0 between the received spread sequence and the locally produced spread sequence. The NCO 108 controls the gold-code generator 109 in such a manner that the output signal from the subtractor 106 tends to zero. In an ideal reception situation, the demodulation correlator 103 is then supplied with the gold code in the correct phase, occurring precisely at the time of the center of the two shifted gold codes.

Figure 2:
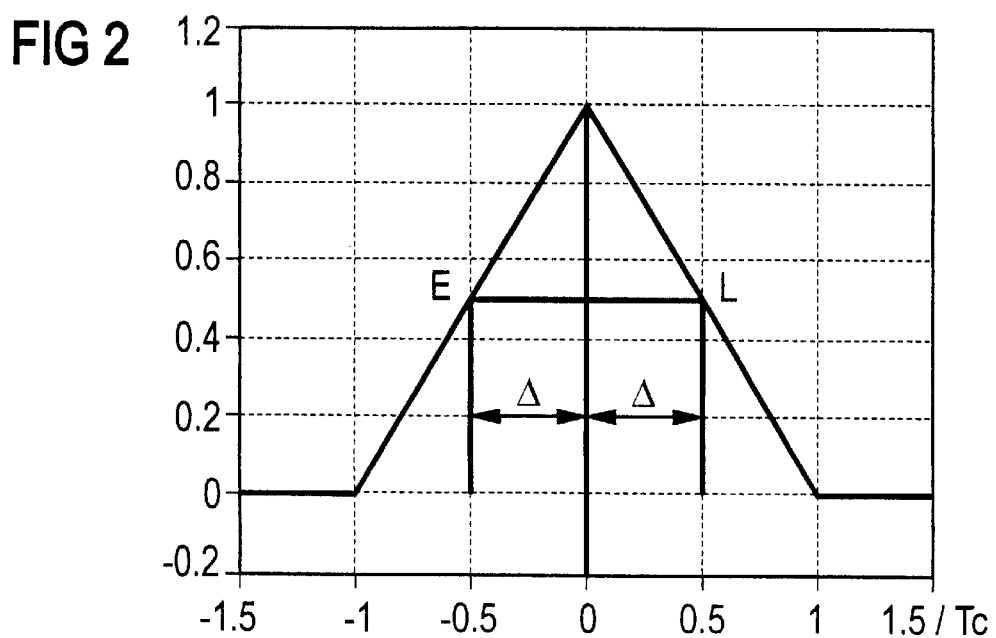
FIG. 2 shows a graph with the profile of the output of a correlator as a function of the phase angle of the local spread sequence.

FIG. 2 shows the method of operation of the arrangement in FIG. 1. An ideal square-wave received signal I' and Q' and a square-wave gold code are assumed in this case. Tc is the bit period of the gold code. The triangular waveform curve is the output signal from a correlator as a function of the phase difference between the received spread code and the locally produced code. When the phase difference is zero, that is to say in the steady state, the output of the correlator becomes unity (a maximum value of 1 is achieved by normalization). The correlation output falls linearly, until it reaches zero at a phase difference of 1 Tc, and remains zero for larger phase shift values. The behavior of the correlation output is symmetrical for positive and negative phase shifts. The correlator 105 in FIG. 1 is supplied with the gold code with a phase shift of −Δ, that is to say the correlator 105 produces a correlation output corresponding to the point E (Early) in FIG. 2. In contrast, the correlator 104 is supplied with the gold code with a positive phase shift of +Δ, so that this produces a correlation output corresponding to the point L (Late) in FIG. 2. The early-late spacing of the gold codes 2D passed to the correlators 104 and 105 is the term normally used for this purpose in the English-language literature. The control loop in FIG. 1 ensures that the correlators 104 and 105 produce an output with the same magnitude. The demodulation correlator 103 is operated with a local gold code, whose phase occurs precisely in the center between the phase angles E and L. In ideal conditions, the delay locked loop in FIG. 1 is thus able to demodulate precisely the data contained in the received signal.

Figure 3:
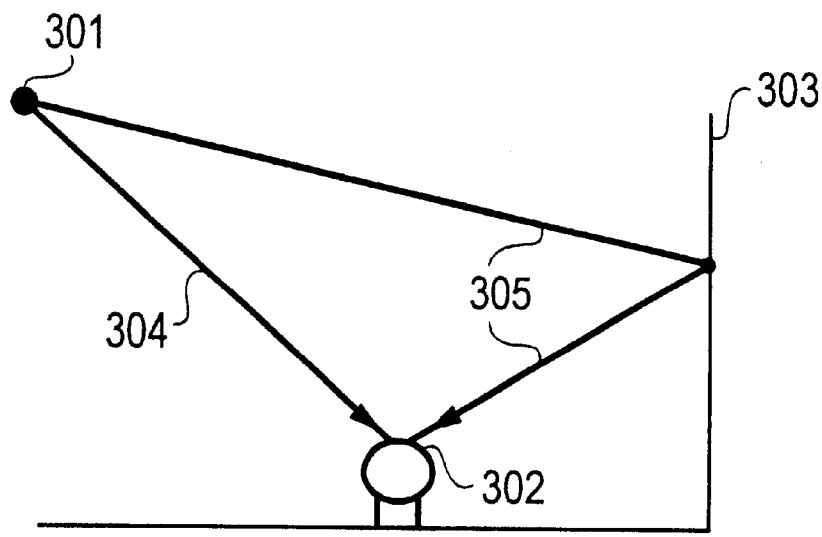
FIG. 3 shows an example of an environment with multipath propagation.

FIG. 3 shows a reception situation as occurs very often in practice. A satellite transmitter 301 transmits a signal which is received by a receiver 302 on the earth's surface via a plurality of propagation paths. The receiver 302 on the one hand receives a signal on a direct line of sight to the transmitter 304. Furthermore, the receiver 302 receives a signal which has been reflected on a nearby terrain formation 303 or on a nearby building 303. The reflected signal 305 and the direct signal 304 are superimposed in the receiver 302. Since the propagation paths have given lengths, this superimposition is not, however, in phase. This is a problem for satellite position-finding using GPS since the coordinate output from the receiver 302 is based on the delay time of the received signal.

Figure 4:
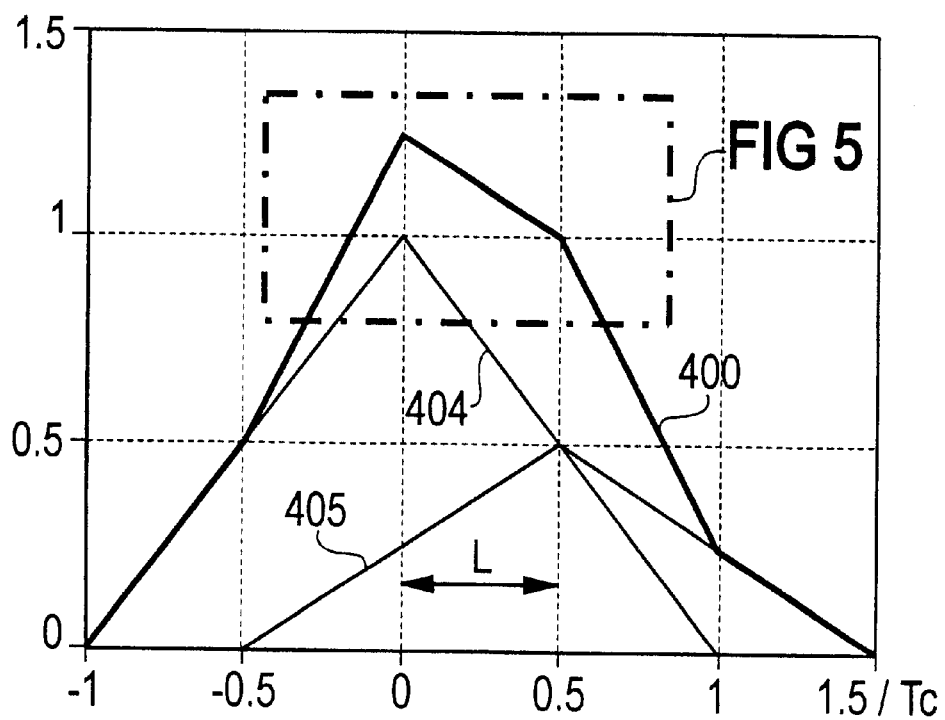
FIG. 4 shows a graph with the profile of the output signal of a correlator as a function of the phase angle of the local spread sequence for a multipath propagation environment.

FIG. 4 shows the linearized correlator output for a reception situation shown in FIG. 3. The triangular-waveform curve 404 is in this case based on the element of the directly received signal 304 and corresponds to the profile shown in FIG. 2. The triangular-waveform curve 405 corresponds to the reflected signal 305, which on the one hand has a reduced amplitude and on the other hand arrives at the receiver 302 delayed by the additional propagation time L. The maximum of the curve 405 is thus shifted by the time L from the maximum of the curve 404. Since the signals from the two propagation paths 304 and 305 are superimposed linearly in the receiver, a correlator in the receiver, which correlates the received spread sequence with the locally produced gold code, emits a signal which corresponds to the profile of the curve 400, depending on the phase shift between the received spread sequence and the locally produced gold code. Tc is in this case once again the bit period of the gold code. The profile of the curve 400 is now asymmetric with respect to the phase angle (sought by the receiver) of the direct reception path 304. The delay locked loop according to the prior art in FIG. 1 would not lead the demodulation correlator 103 to the desired phase zero point of the direct reception path 304, owing to this asymmetry.

Figure 5:
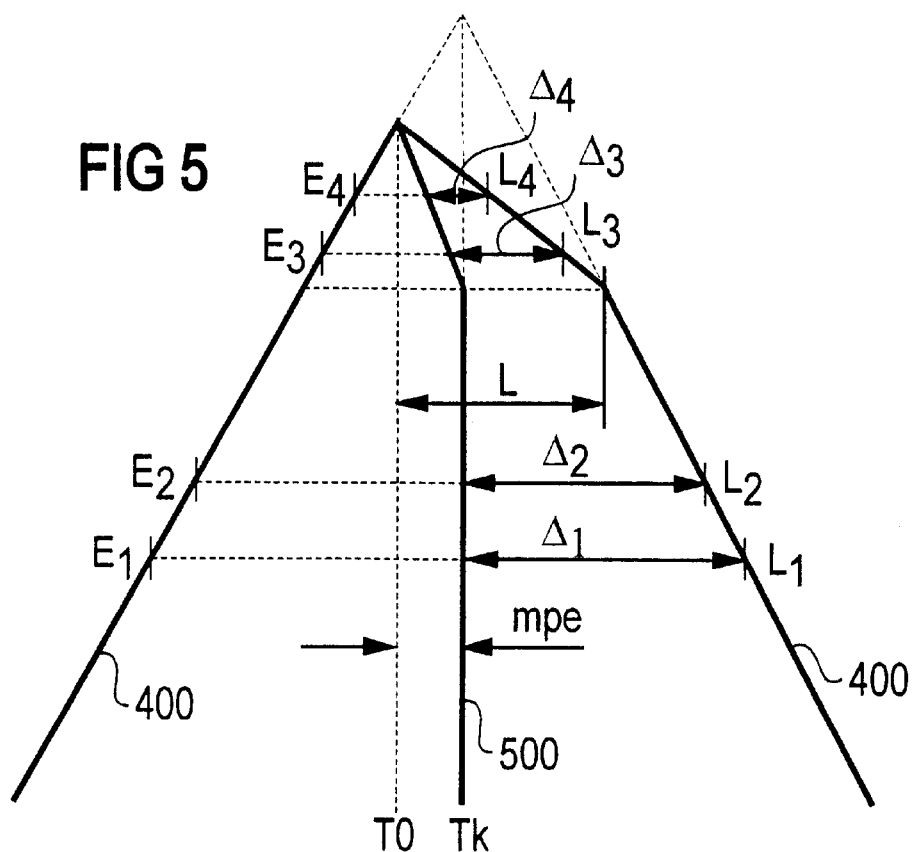
FIG. 5 shows a detailed portion of the graph in FIG. 4.

FIG. 5 shows, in detail, a portion of the curved profile 400 from FIG. 4. In places, the curve 400 is symmetrical with respect to an imaginary center line, which differs from the sought phase angle T0 of the direct reception path 304 by the phase difference mpe=Tk−T0 (mpe: multiphase error). The points E1, L1; E2, L2; E3, L3 and E4, L4 show the behavior of a delay locked loop DLL according to the prior art for different early-late spacings D1, D2, D3 and D4 when the control loop is in the steady state. The curve 500 in this case shows the profile of the phase angle as a function of different early-late spacings, which the delay locked loop outputs in the steady state as a phase center point (the point phase angle) between the phase angles E and L. For large different early-late spacings, such as Δ1 and Δ2, the phase center point set in this way differs from the sought value T0 by the same value mpe in each case, owing to the partial symmetry of the curve 400. For very small early-late spacings, such as Δ3 or Δ4, the phase error mpe is directly proportional to the chosen early-late spacing. In the graph in FIG. 5, L denotes the delay time difference between the directly received signal 304 and the reflected signal 305, as is also shown in FIG. 4.

Figure 6:
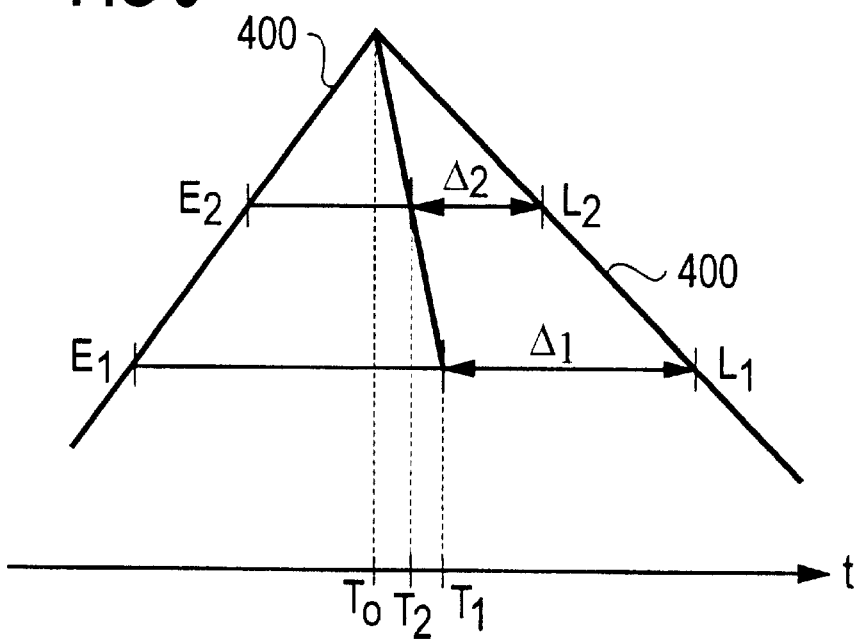
FIG. 6 shows a geometric representation of a computation rule for the invention.

FIG. 6 shows the procedure according to the invention for searching for the phase zero point for the directly received signal 304. The presence of two delay locked loops with different early-late spacings is assumed. If the early-late spacings are chosen to be sufficiently small, the time T0 can be determined precisely from the times T1 and T2 determined in each individual control loop in the steady state. By comparing similar triangles, this results in:

$$T0=(\Delta2\ T1-\Delta1\ T2)/(\Delta2-\Delta1).$$

The formula gives an accurate result when the early-late spacings of the two control loops are chosen to be sufficiently small that they become stable at the upper, asymmetric peak of the curve 400 (for example D3 and D4 in FIG. 5). Since the error mpe caused by multipath propagation is typically very small in comparison with the delay time difference L, the early-late spacing of the two control loops must for this purpose be chosen to be smaller than that delay time difference L for multipath propagation which is still tolerable. If, on the other hand, the early-late spacing of the two control loops is chosen to be greater than the delay time difference L, then the two delay locked loops become stable at T1=T2=Tk which results, according to the formula mentioned above, in no correction being made for this case, since, then, T0=Tk.

FIG. 7 shows an arrangement according to the invention. An in-phase component I and a quadrature component Q of the received signal are supplied to a demodulation correlator 1. A local gold-code generator 4 is actuated by a numerically controlled oscillator NCO 3, such that the demodulation correlator is supplied with a gold code with a matched phase. The demodulation correlator can thus produce an output bit stream by correlation. The NCO 3 is in this case controlled by means of a microprocessor 2, which reports a phase value T0 to the NCO 3. The arrangement of the invention has a delay locked loop 5 (DLL1) and a delay locked loop 6 (DLL2), to which the in-phase component I and the quadrature component Q of the received signal are likewise supplied. The delay locked loops 5 and 6 correspond to the delay locked loop DLL shown surrounded by a dashed line in FIG. 1. Each delay locked loop thus has the feature blocks illustrated in a corresponding manner in FIG. 1. In this case, each delay locked loop 5 and 6 can be supplied with the value of the early-late spacing Δ1 or Δ2 used in it. The values Δ1 and Δ2 are defined (according to the arrangement of the invention shown in FIG. 7) by the microprocessor 2. Each delay locked loop emits a phase angle T1 or T2, which respectively correspond to the phase angle T0 illustrated in FIG. 1 and emitted by the loop filter 107. The microprocessor 2 uses the early-late spacings $\Delta_1$ and $\Delta_2$ preset by it and the phase angles T1 and T2, respectively, determined by the phase locked loops DLL1 and DLL2, respectively, to calculate the optimal phase angle T0 using the formula quoted above, by means of which the NCO 3 actuates the gold-code generator. The invention makes it possible to ensure that a precise phase angle T0 is determined in accordance with the formula quoted above for the direct reception path 304, by choosing the early-late spacings Δ1 and Δ2 to be sufficiently small.

The invention can be used particularly advantageously in an environment in which a large number of delay locked loops DLL1, DLL2, __DLLn are provided in addition to the demodulation correlator 1. While the control loops with a large early-late spacing ensure that the overall system has a stable control response, the control loops with the two smallest early-late spacings (the innermost control loops) can be used to precisely determine the phase angle T0 of the direct reception path 304. An arrangement has been found to be particularly advantageous in which a large number of control loops are provided, whose early-late spacings are in each case halved as the early-late spacings become smaller. When it is certain that the early-late spacings of the innermost control loops are smaller than the delay time difference from multipath propagation, precise correction can be ensured. If the early-late spacing of only one control loop is less than the minimum delay time difference Lmin, then the correction is still at least partial in the direction of the precise phase angle T0.

We claim:

1. A method of minimizing an autocorrelation error in a demodulation of a spread-spectrum signal which is received from a transmitter via a plurality of propagation paths, the method which comprises:

providing a local spread sequence and correlating the local spread sequence with a received spread sequence in a first control loop on a first phase-angle pair having a first early-late spacing $2\Delta_1$;

correlating the local spread sequence with the received spread sequence in a second control loop on a second phase-angle pair having a second early-late spacing $2\Delta_2$;

whereby the first control loop and the second control loop emit a first point phase value $T_1$ and a second point phase value $T_2$ respectively, when in the steady state; and calculating a phase $T_0$ with which the local spread sequence is supplied to a demodulation correlator, with respect to the received spread sequence, according to the formula $$T_0=(\Delta_2 \cdot T_1 - \Delta_1 \cdot T_2)/(\Delta_2 - \Delta_1)$$

where $\Delta_2$ is chosen to be $<\Delta_1$.

2. The method according to claim 1, which comprises setting a ratio of the first early-late spacing $\Delta_1$ to the second early-late spacing $\Delta_2$ to 2.

3. The method according to claim 1, wherein the first control loop and the second control loop are innermost control loops of a hierarchical control loop structure for determining the phase value $T_0$.

4. The method according to claim 1, which comprises setting at least half the first early-late spacing $\Delta_1$ or half the second early-late spacing $\Delta_2$ to substantially less than an expected minimum signal delay time difference between a direct propagation path and an indirect propagation path.

5. A system for demodulating a spread-spectrum signal received from a transmitter via a plurality of propagation paths, comprising:

a demodulation correlator receiving a spread-spectrum signal with a received spread sequence;

a generator for producing a local spread sequence;

a first control loop connected to said generator for correlating the received spread sequence with the local spread sequence on a first phase-angle pair having a first early-late spacing $2\Delta_1$, said first control loop outputting a first point phase value $T_1$ in a steady state thereof;

a second control loop connected to said generator for correlating the received spread sequence with the local spread sequence on a second phase-angle pair having a second early-late spacing $2\Delta_2$ less than the first early-late spacing $2\Delta_1$, said second control loop outputting a second point phase value $T_2$ in a steady state thereof; and a device for determining a phase value $T_0$ for supplying the local spread sequence to said demodulation correlator, with respect to the received spread sequence in accordance with the formula $$T_0=(\Delta_2 \cdot T_1 - \Delta_1 \cdot T_2)/(\Delta_2 - \Delta_1).$$

6. The system according to claim 5, wherein a ratio of the first early-late spacing $\Delta_1$ to the second early-late spacing $\Delta_2$ is 2.

7. The system according to claim 5, wherein said first control loop and said second control loop are two innermost control loops of a hierarchical control loop structure for determining the phase value $T_0$.

8. The system according to claim 5, wherein at least half the first early-late spacing $\Delta_1$ or half the second early-late spacing $\Delta_2$ is set to substantially less than an expected minimum signal delay time difference between a direct propagation path and an indirect propagation path.

* * * * *